United States Patent
Smeets

(10) Patent No.: US 7,054,613 B2
(45) Date of Patent: May 30, 2006

(54) SIM CARD TO MOBILE DEVICE INTERFACE PROTECTION METHOD AND SYSTEM

(75) Inventor: Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 339 days.

(21) Appl. No.: 10/406,048

(22) Filed: Apr. 2, 2003

(65) Prior Publication Data

US 2003/0220096 A1    Nov. 27, 2003

Related U.S. Application Data

(60) Provisional application No. 60/377,738, filed on May 3, 2002.

(51) Int. Cl.
*H04Q 7/32* (2006.01)

(52) U.S. Cl. ............. 455/410; 455/411; 455/558; 380/268; 380/270

(58) Field of Classification Search ............. 455/466, 455/558, 557; 380/247, 270; 713/168, 169, 713/172
See application file for complete search history.

(56) References Cited

U.S. PATENT DOCUMENTS

| | | | | |
|---|---|---|---|---|
| 5,933,773 A * | 8/1999 | Barvesten | ............. | 455/411 |
| 6,026,293 A * | 2/2000 | Osborn | ............. | 455/411 |
| 6,124,799 A | 9/2000 | Parker | ............. | 340/825.34 |
| 6,198,823 B1 * | 3/2001 | Mills | ............. | 380/247 |
| 6,374,355 B1 * | 4/2002 | Patel | ............. | 713/168 |
| 6,442,532 B1 * | 8/2002 | Kawan | ............. | 705/36 R |
| 6,504,932 B1 * | 1/2003 | Vasnier et al. | ............. | 380/273 |
| 6,557,104 B1 * | 4/2003 | Vu et al. | ............. | 713/189 |
| 6,690,930 B1 * | 2/2004 | Dupre | ............. | 455/411 |
| 6,745,326 B1 * | 6/2004 | Wary | ............. | 713/168 |
| 6,792,277 B1 * | 9/2004 | Rajaniemi et al. | ......... | 455/456.1 |
| 6,886,095 B1 * | 4/2005 | Hind et al. | ............. | 713/168 |

FOREIGN PATENT DOCUMENTS

| | | |
|---|---|---|
| EP | 0 932 317 A1 | 7/1999 |
| EP | 1 001 640 A1 | 5/2000 |
| FR | 2 797 138 | 2/2001 |
| FR | 2 812 510 A1 | 2/2002 |

OTHER PUBLICATIONS

Oppenberg, S., International. Search Report for PCT/EP03/04421 as prepared Sep. 17, 2003. (7 pgs).

* cited by examiner

*Primary Examiner*—Edward Urban
*Assistant Examiner*—Richard Chan

(57) ABSTRACT

Method and system for protecting an interface between a mobile device for a wireless telecommunications system and a smart card. A method according to the present invention comprises generating a first key in the mobile device and a second key in the smart card, generating a first authentication value in the mobile device using the first key and generating a second authentication value in the smart card using the second key, and comparing the generated first and second authentication values. Use of the mobile device and/or the smart card is enabled based on a result of the comparison.

5 Claims, 3 Drawing Sheets

SIM CARD TO MOBILE DEVICE INTERFACE PROTECTION METHOD AND SYSTEM

RELATED APPLICATIONS

This application claims the benefit and incorporates by reference the entire disclosure of U.S. Provisional Patent Application Ser. No. 60/377,738, which was filed May 3, 2002.

BACKGROUND OF THE INVENTION

1. Technical Field of the Invention

The present invention relates generally to the mobile telecommunications field; and, more particularly, to a method and system for protecting the integrity of the interface between a mobile device, and a "smart" card provided in the mobile device.

2. Description of Related Art

In the mobile telecommunications field, a smart card provides the mechanism by which a Mobile Station (MS), such as a mobile telephone or other mobile device, can be "locked" to a particular telecommunications network. The smart card is mounted in a mobile device and provides a network subscriber with authorization to use the mobile device in the network; and, in addition, provides the network operator with the ability to control the manner in which the mobile device is used in the network.

In GSM (Global System for Mobile Communications), the smart card is generally referred to as a SIM (Subscriber Information Module) card; and in the following description, reference will primarily be made to a SIM card used in GSM. It should be understood, however, that the present invention is not limited to SIM cards or to GSM, but is intended to cover other smart cards used in other wireless telecommunications systems such as, for example, the UICC (Universal Integrated Circuit Card) card that is used in UMTS (Universal Mobile Telecommunications System).

In GSM, the SIM card is the main secure carrier of private/secret (key) information to authorize network access to and to provide, via SAT (SIM Application Toolkit), control over a mobile device. In particular, the SIM card carries network parameters (in, for example, so-called GID fields) that control the SIM lock functionality by which a network operator can lock a mobile device to its network. The mobile device obtains the SIM lock-related parameters that enable the mobile device to operate in the network from the SIM card via a card reader in the mobile device.

The current electrical interface (standard) that describes how SIM cards and their associated card readers should function realizes an open physical channel between the SIM card and the card reader in the mobile device that is unprotected. As a result, the interface is susceptible to being penetrated by an active wiretapper. Attacks that have been reported, for example, include those that "spoof" the SIM lock system by inserting a micro chip between the electrical interface of the SIM card and the SIM card reader in the mobile device. The micro chip provides bogus data when the mobile device requests the SIM lock-related parameters from the SIM card, and can enable unauthorized use of the mobile device.

Even an authorized user of a mobile device may find it advantageous to function as an active wiretapper in certain situations. For example, a user may obtain a subsidized mobile phone from one network operator in return for agreeing to utilize that operator's network. The user can then actively wiretap the open channel between the phone and the SIM card to enable the user to use the phone in another network. As a result, the operator that provided the subsidized phone to the user can lose its investment in the subsidized phone.

SUMMARY OF THE INVENTION

The present invention provides a method and system for protecting an interface between a mobile device and a smart card provided in the mobile device against active wiretapping.

A method for protecting an interface between a mobile device for a wireless telecommunications system and a smart card according to the present invention comprises generating a first key in the mobile device and a second key in the smart card, generating a first authentication value in the mobile device using the first key and generating a second authentication value in the smart card using the second key, and comparing the generated first and second authentication values, wherein use of the mobile device is enabled based on a result of the comparison.

The present invention recognizes that the electrical and logical interface between a mobile telecommunications device and a smart card provided in the device is open and not protected; and, thus, is susceptible to being penetrated by an active wiretapper. The present invention prevents such penetration by enabling use of the mobile device only as a result of a comparison of authentication values that are separately generated in the mobile device and the smart card, making it highly unlikely that an active wiretapper can utilize the mobile device in an unauthorized manner.

According to exemplary embodiments of the invention, systems are provided for generating a secret key that will be known to only the mobile device and the smart card so as to prevent even a normal user of the mobile device from using the device in an unauthorized manner. The systems can include the support of the network that issued the smart card or be entirely incorporated within the mobile device.

Further exemplary embodiments and other features and advantages of the invention will become apparent from the following detailed description with reference to the following drawings.

DETAILED DESCRIPTION OF EXEMPLARY EMBODIMENTS OF THE INVENTION

Figure 1:
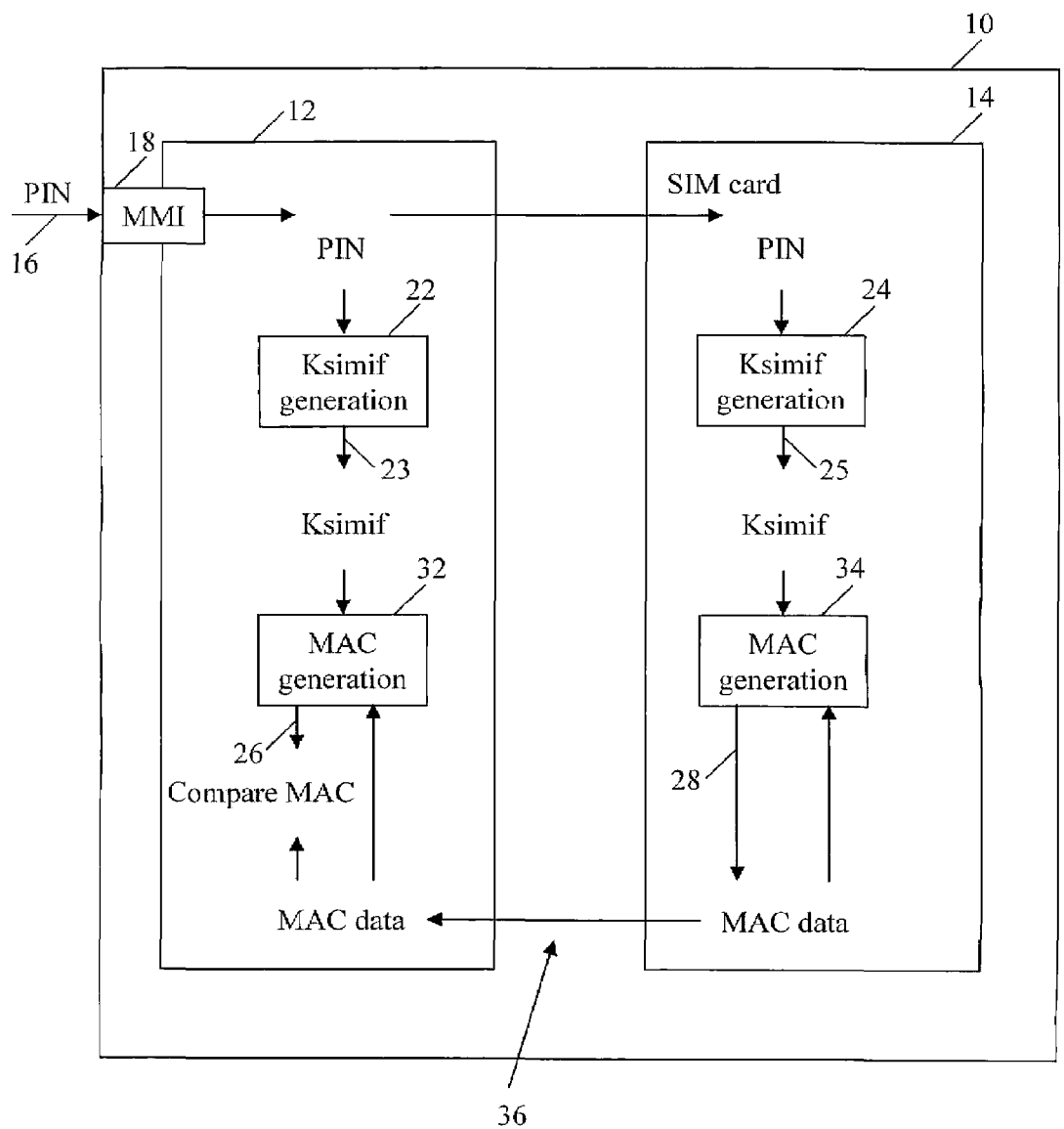
FIG. 1 is a block diagram that schematically illustrates a system for protecting an interface between a mobile device of a wireless telecommunications system and a smart card provided in the mobile device in accordance with an exemplary embodiment of the present invention.

FIG. 1 is a block diagram that schematically illustrates a system for protecting an interface between a mobile device for a wireless telecommunications system and a smart card according to an exemplary embodiment of the present invention. The system is generally designated by reference number 10 and includes a mobile device 12, such as a mobile telephone, and a smart card 14 provided in the mobile device. In the exemplary embodiments described herein, system 10 is utilized in GSM, and smart card 14 comprises a SIM card.

As illustrated in FIG. 1, a PIN (Personal Identification Number) 16 is first entered into system 10 via a man-machine interface (MMI) 18 (methods by which PIN 16 may be entered will be described hereinafter). As shown in FIG. 1, PIN 16 is retained in mobile device 12 and is also passed to SIM card 14, and is used to establish/generate a secret key in both mobile device 12 and SIM card 14.

In particular, in mobile device 12, PIN 16 is used to generate a first secret key 23 (also referred to herein as secret key K1) via Ksimif generation software 22. In SIM card 14, PIN 16 is used to generate a second secret key 25 (also referred to herein as secret key K2) via Ksimif generation software 24. Secret keys 23 and 25 are then used to generate Message Authentication Codes (MACs) 26 and 28 in mobile device 12 and in SIM card 14, respectively, via MAC generation software 32 and 34 in the mobile device and the SIM card, respectively. If secret key K1 (23) is the same as secret key K2 (25), (i.e., K1=K2=Ksimif), MACs 26 and 28 will also be the same (i.e. MAC 26=MAC 28).

MAC 26 and MAC 28 are then compared as shown at 36, and if the comparison results in a match, mobile device 12 will be enabled so that it may be used in a normal manner by a user. If the comparison does not result in a match, the mobile device will not be enabled and cannot be used. Clearly, by reversing the data flow, the use of MACs can also protect data going from the mobile device into the SIM card.

Thus, with the present invention, a user will be able to operate mobile device 12 in a normal manner only if MAC 26 generated in the mobile device matches MAC 28 generated in the SIM card. An active wiretapper that wishes to use the mobile device in an unauthorized manner by, for example, inserting bogus data in the interface between the mobile device and the SIM card, will have to be able to generate a MAC that matches MAC 26 in the mobile device in order to be able to use the mobile device. MACs 26 and 28 are each generated from MAC fields provided in the mobile device and the SIM card, and by making the MAC fields sufficiently large, the probability of an active wiretapper succeeding without knowing the secret key can be made arbitrarily small.

The protection system illustrated in FIG. 1 requires the establishment of a secret shared key, Ksimif, that is shared by the mobile device and the SIM card. For maximum protection, it is desirable that only the mobile device and the SIM card know the secret key. In this regard, even the owner (user) of the mobile device is a potential attacker, and should not have easy access to the key. In addition, it is important that the owner (user) not be able to replay previously generated correct MAC data pairs when mounting an attack.

Figure 2:
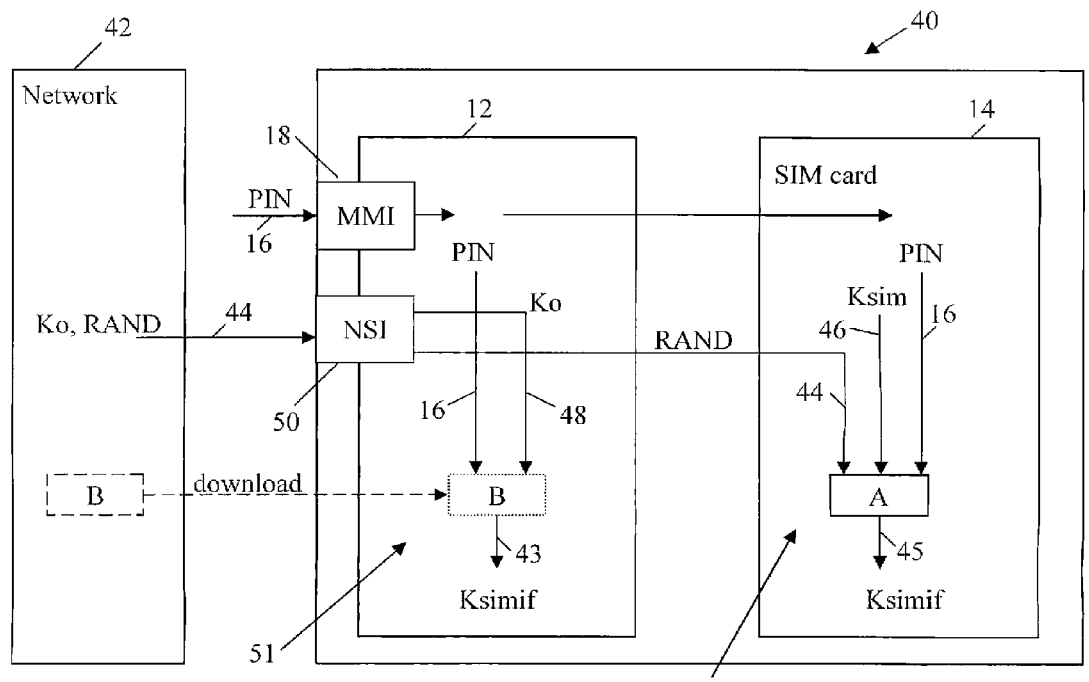
FIG. 2 is a block diagram that schematically illustrates a system for generating matching secret keys in a mobile device and a smart card provided in the mobile device according to another exemplary embodiment of the present invention.

In accordance with another exemplary embodiment of the present invention, FIG. 2 is a block diagram that illustrates a system 40 by which a matching secret key, Ksimif, that is known by only the mobile device and the SIM card can be generated by the mobile device and the SIM card via Ksimif generation software 51 and 52, respectively.

As shown in FIG. 2, the operator of a network 42 (the operator that originally distributes the SIM card to a user) stores an algorithm A in SIM card 14 and gives an algorithm B to the mobile device manufacturer to be included in the software of mobile device 12 as part of the mobile device customization process during production. Algorithm A generates secret key 45 (K2) using input PIN 16, a key 46 (Ksim) provided in the SIM card, and an input, randomly generated RAND 44. Algorithm B generates secret key 43 (K1) using input PIN 16 and input key 48 (Ko), where the value of Ko is obtained from RAND 44 by an algorithm C (not illustrated in the FIGURE), i.e., Ko=C(Ksim, RAND) that uses Ksim and RAND as inputs.

When the mobile device enters a network, it will contact the operator. The operator will send (using standard protected communication channels) the values of a randomly chosen RAND and the matching Ko via Network Services Interface (NSI) 50. Ko is retained in the mobile device, and the value of RAND is passed to the SIM card. The mobile device runs algorithm B on the PIN 16 that was entered and the received value of Ko 48 to provide secret key 43 (K1). In the SIM card, the algorithm A is executed on the received PIN 16, the value of Ksim 46 and the value of RAND 44 to provide secret key 45 (K2) as the output of algorithm A. If K1=K2=Ksimif, the MACs generated therefrom in the mobile device and the SIM card will also match, and use of the mobile device will be enabled.

The operator can also use Subscriber Access Termination (SAT) to send the value of RAND with a protected/encrypted channel to the SIM.

According to another exemplary embodiment of the invention, rather than being installed by the manufacturer of the mobile device, the operator of network 42 can download algorithm B into the mobile device as illustrated in dotted line in FIG. 2. Preferably, the download procedures support the secure download of software as, for example, through digital signed SW jar files in JAVA.

According to a further exemplary embodiment of the invention, the network-assisted generation of the shared secret key Ksimif can be replaced by a technique that uses only resources in the mobile device. This can be achieved by also implementing algorithm A, used by the SIM card, in the mobile device. Preferably, algorithm A and the key Ksim are implemented in a tamper-resistant unit of the mobile device that was programmed with algorithm A and Ksim during manufacture of the mobile device.

Figure 3:
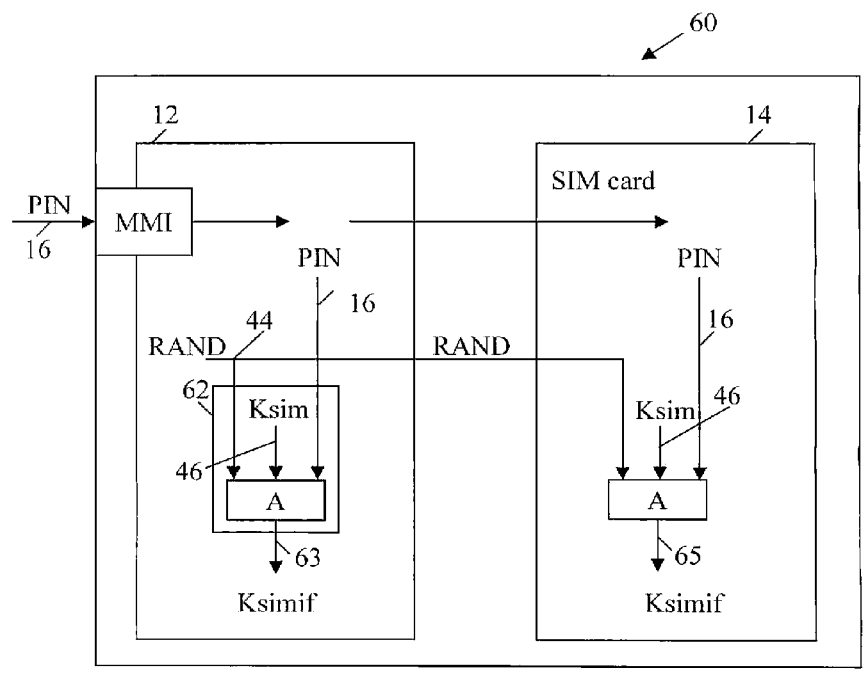
FIG. 3 is a block diagram that schematically illustrates a system for generating matching secret keys in a mobile device and a smart card provided in the mobile device according to another exemplary embodiment of the present invention.

FIG. 3 is a block diagram that schematically illustrates a system 60 by which a matching secret key, Ksimif, that is known by only the mobile device and the SIM card, can be generated by the mobile device and the SIM card in a manner that does not require network assistance, according to another exemplary embodiment of the invention.

In system 60, mobile device 12 includes a tamper resistant unit 62 that has been programmed with Algorithm A and Ksim during manufacture of the mobile device. As shown in FIG. 3, a random value RAND 44, the value Ksim 46 and the PIN 16 are used in both the mobile device and the SIM card to generate the secret keys 63 (K1) and 65 (K2) from which the MACs are generated. As before, if K1=K2 (i.e., both are Ksimif), use of the mobile device is enabled.

Figure 4:
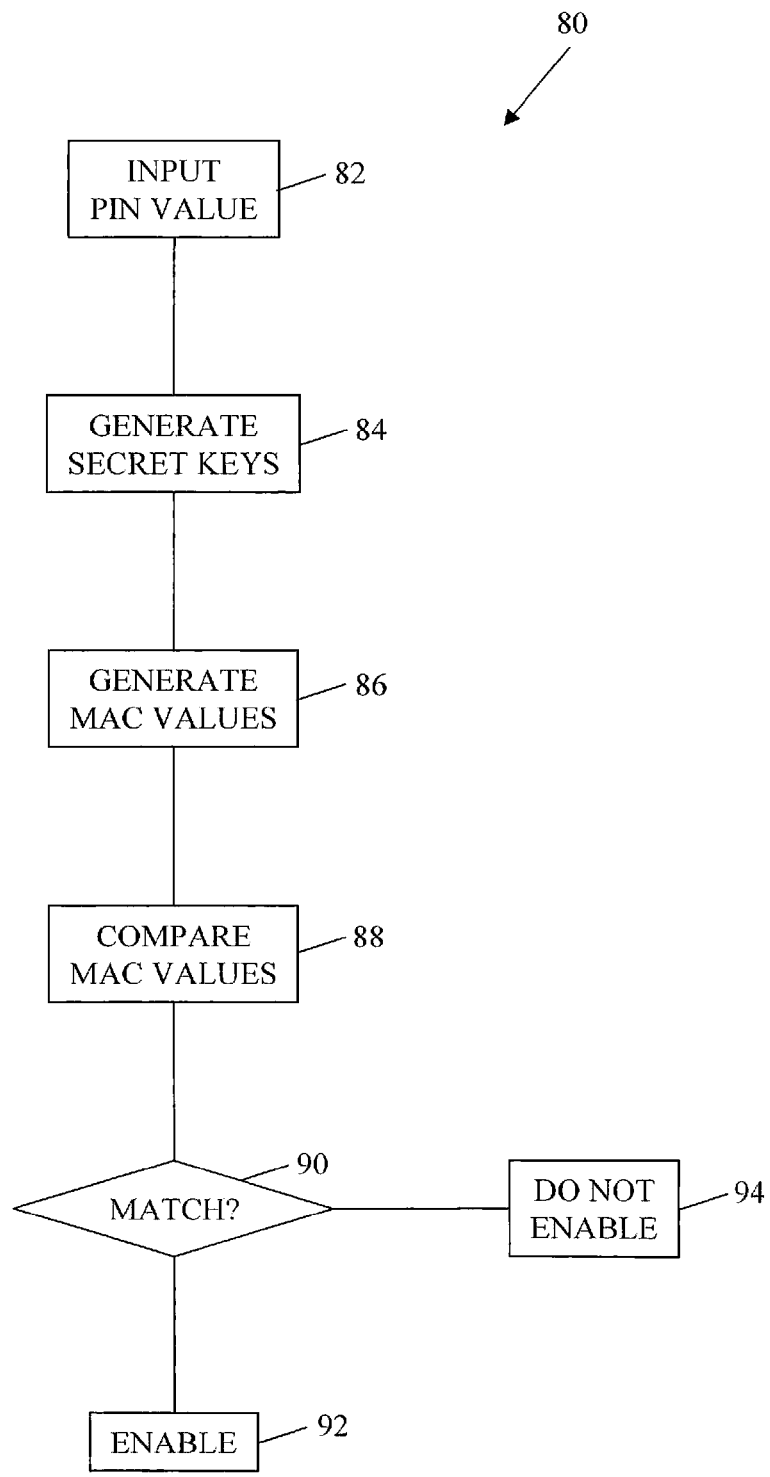
FIG. 4 is a flow chart that illustrates steps of a method for protecting an interface between a mobile device and a smart card provided in the mobile device according to another exemplary embodiment of the present invention.

FIG. 4 is a flow chart that schematically illustrates steps of a method for protecting an interface between a mobile telecommunications device and a smart card provided in the device in accordance with another exemplary embodiment of the present invention. The method is generally designated by reference number 80, and begins by inputting a PIN value to both a mobile device and a SIM card for the mobile device (step 82). Secret keys are then generated in both the mobile device and the SIM card using a PIN (step 84), and the generated keys are then used to generate MAC values in both the mobile device and the SIM card (step 86). The MAC values generated in the mobile device and the SIM card are then compared (step 88). If the result of the comparison is a match (Y output of block 90) use of the mobile device and/or SIM card is enabled (step 92). If the result of the comparison is not a match (N output from block 90), use of the mobile device is not enabled (step 94).

While what has been described constitute exemplary embodiments of the present invention, it should be recognized that the invention can be varied in many ways without departing from the scope thereof For example, although the exemplary embodiments described herein utilize symmetric cryptographic techniques to generate the MACs, other techniques such as digital signature techniques can also be used if desired. Because the invention can be varied in many ways, it should be understood that the invention should be limited only insofar as is required by the scope of the following claims

I claim:

1. A method for protecting an interface between a mobile device for a wireless telecommunications system and a smart card, comprising:
   generating a first key in the mobile device and a second key in the smart card;
   generating a first authentication value in the mobile device using the first key and generating a second authentication value in the smart card using the second key; and
   comparing the generated first and second authentication values,
   wherein use of at least one of the mobile device and the smart card is enabled based on a result of the comparison;
   wherein the mobile device includes a first algorithm and the smart card includes a second algorithm, and wherein the first key is generated in the mobile device using the first algorithm and the second key is generated in the smart card using the second algorithm;
   wherein the first key is generated from the first algorithm using an input Personal Identification Number and an input key generated from a randomly generated value, and wherein the second key is generated from the second algorithm using the input Personal Identification Number, a key provided in the smart card and the randomly generated value.

2. The method according to claim 1, wherein the randomly generated value and the input key are provided by an operator of a wireless telecommunications network.

3. The method according to claim 1, wherein the second algorithm is installed in the smart card by a manufacturer of the smart card.

4. The method according to claim 1, wherein the second algorithm is downloaded in the smart card by an operator of a wireless telecommunications network.

5. A system for protecting an interface between a mobile device for a wireless telecommunications system and a smart card, comprising:
   a first key generator for generating a first key in the mobile device and a second key generator for generating a second key in the smart card;
   a first authentication value generator in the mobile device for generating a first authentication value in the mobile device using the first key, and a second authentication value generator for generating a second authentication value in the smart card using the second key; and
   a comparator for comparing the generated first and second authentication values, wherein use of at least one of the mobile device and the smart card is enabled based on a result of the comparison;
   wherein the first key generator includes a first algorithm and the second key generator includes a second algorithm, and wherein the first key is generated in the mobile device using the first algorithm and the second key is generated in the smart card using the second algorithm;
   wherein the first key is generated from the first algorithm using an input Personal Identification Number and an input key generated from a randomly generated value, and wherein the second key is generated from the second algorithm using the input Personal Identification Number, a key provided in the smart card and the randomly generated value.

* * * * *